C. A. WITTER.
SHOCK RELIEF VALVE FOR HYDRAULIC SYSTEMS.
APPLICATION FILED FEB. 1, 1916.

1,244,271. Patented Oct. 23, 1917.

Inventor-
Claude A. Witter.
by his Attorneys.

UNITED STATES PATENT OFFICE.

CLAUDE A. WITTER, OF LEWISTOWN, PENNSYLVANIA, ASSIGNOR TO THE STANDARD STEEL WORKS COMPANY, OF BURNHAM, PENNSYLVANIA, A CORPORATION OF PENNSYLVANIA.

SHOCK-RELIEF VALVE FOR HYDRAULIC SYSTEMS.

1,244,271.  Specification of Letters Patent.  Patented Oct. 23, 1917.

Application filed February 1, 1916. Serial No. 75,607.

*To all whom it may concern:*

Be it known that I, CLAUDE A. WITTER, a citizen of the United States, and a resident of Lewistown, county of Mifflin, State of Pennsylvania, have invented certain Improvements in Shock-Relief Valves for Hydraulic Systems, of which the following is a specification.

One object of my invention is to construct a shock relief valve for hydraulic systems so that the piston will be in such a position that it will absorb a greater portion of the shock, preventing the shock from being transmitted to the mechanism.

A further object of the invention is to design the shock absorber so that the spring section can be removed from the plunger and cylinder without releasing the springs.

Figure 1:
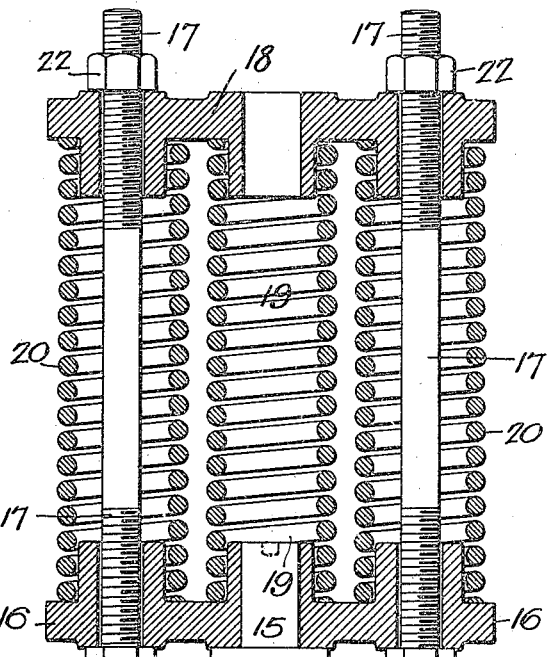
Figure 3:
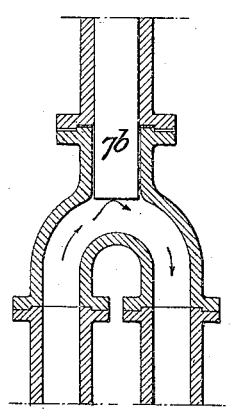
Figure 2:
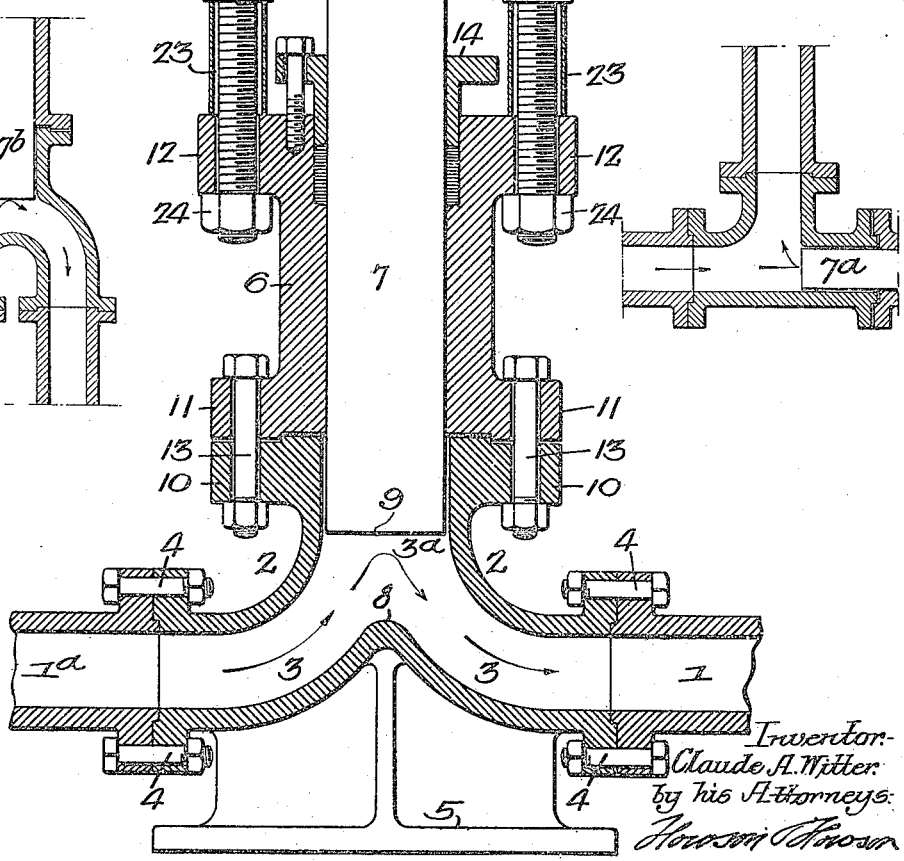

In the accompanying drawings:

Figure 1 is a vertical sectional view illustrating my improved shock absorber located in the line of a hydraulic system; and Figs. 2 and 3 are views illustrating modifications of the invention.

Referring to the drawings, 1, 1ᵃ is the pipe line extending from the pressure mechanism to the machine or machines which are operated by the hydraulic mechanism. 2 is the base of the shock relief valve having a passage 3 which communicates with the pipes 1 and 1ᵃ, in the present instance, being flanged and secured to flanges on the base 2 by bolts 4, but other means of fastening may be used, if desired.

The base section 2 has an enlarged foot 5 which supports the valve structure in the present instance. 6 is the cylindrical valve casing in which is mounted the plunger valve 7. The plunger valve extends, in the present instance, into the portion 3ᵃ of the passage 3 and forms a part of the upper wall of said passage. The base has a central weir 8, preferably curved at each side which extends, in the present instance, to about the top of the pipes 1, 1ᵃ, so that fluid passing through the pipe line is deflected by this weir and is directed against the lower end 9 of the plunger valve 7 so that in the event of a shock occurring, due to a sudden leakage, or parts breaking at the pressure mechanism, the shock will be almost entirely taken up by the plunger valve 7 instead of being transmitted to the mechanism which is actuated by the hydraulic pressure, thus avoiding breakage and delay in operation. In the present instance, the upper portion of the base 2 is flanged, as at 10, and the cylindrical valve casing 6 is flanged at 11 and 12, the flange 11 being secured to the flange 10 of the base by bolts 13. In the upper end of the casing 6 is a stuffing box and in the stuffing box is a gland 14. The upper end of the plunger valve is reduced, as at 15, and loosely mounted on this reduced portion of the valve is a spring seat 16.

17, 17 are screw rods extending through openings in the spring plate 16 and through openings in an upper spring plate 18 and between these two spring plates is a central spring 19 and side springs 20, in the present instance. There may be as many of these side springs, as desired, according to the diameter of the spring plate and the size of the valve. The springs are held under compression by nuts 21 and 22 on the rod 17, the nuts 21 being located under the spring plate 16 and the nuts 22 being located above the spring plate 18. The rods 17 are extended and pass through openings in the flange 12 of the cylindrical valve casing 6, and spacing sleeves 23 are located between the nuts 21 and the flange 12, and nuts 24 on the rods are located under the flange 12, thus rigidly holding the spring mechanism to the valve casing.

By this construction, the spring sections including the springs, spring plates, and rods can be removed from the cylinder and the plunger valve by simply detaching the nuts 24, as the nuts 21 and 22 hold the springs under compression.

The operation of the valve is as follows:

The springs are adjusted to the proper degree of compression and as the liquid flows through the pipe line it is projected by the curved weir 8 against the lower end 9 of the plunger valve 6 and the pressure of the liquid causes the plunger to be raised, compressing the springs, but should a shock be produced at the pressure mechanism then this shock will be transmitted to the under side of the plunger valve and the springs will take the shock and thus relieve the mechanism at the opposite end of the pipe line, preventing breakage of rigid parts of the hydraulic machine or machines. The moment the shock has been absorbed, the plunger assumes its normal position so that the device is entirely automatic. The valve can be placed at any point desired in the pipe line, and while I prefer the form illustrated in Fig. 1, the form, such as illustrated in Fig. 2, may be used where the piston valve 7ª is located at the end of a right-angled union so that it will be in the direct path of the liquid flowing through the pipe line. In Fig. 3, I have illustrated another modification in which the valve 7ᵇ is located at the end of a U-shaped union, the construction being somewhat similar to that shown in Fig. 1.

I claim:

1. The combination of a base having a passage therein forming the continuation of the pipe line of a hydraulic system; a cylindrical valve casing mounted on the base; a plunger valve mounted in the casing; a lower spring plate mounted on the valve; an upper spring plate; springs located between the two plates; rods extending through the plates; means for adjusting the plates on the rods; extensions on the rods passing through openings in the valve casing; and means for retaining the rods in position on the valve casing so that, on detaching said means, the springs and their plates can be removed as a unit.

2. The combination in a shock relief valve for hydraulic systems, of a base having a passage therein forming a continuation of the pipe line of the system; a cylindrical valve casing mounted on the base; a plunger mounted in the casing and having its end projecting into the passage, said plunger having a reduced upper end; a lower spring plate mounted on the reduced upper end of the plunger, an upper spring plate; springs located between the two plates; rods extending through the two plates; nuts on the rods by which the tension of the spring is regulated, the cylinder having a flange and the rods extending through the flange of the cylinder; nuts on the lower ends of the rods; and spacing sleeves between the flange and the nuts located under the spring plate.

CLAUDE A. WITTER.

Copies of this patent may be obtained for five cents each, by addressing the "Commissioner of Patents, Washington, D. C."